July 21, 1936.   A. E. LIPP   2,048,013
PHOTOGRAPHER'S LIGHTING APPARATUS
Filed July 22, 1933   2 Sheets-Sheet 1
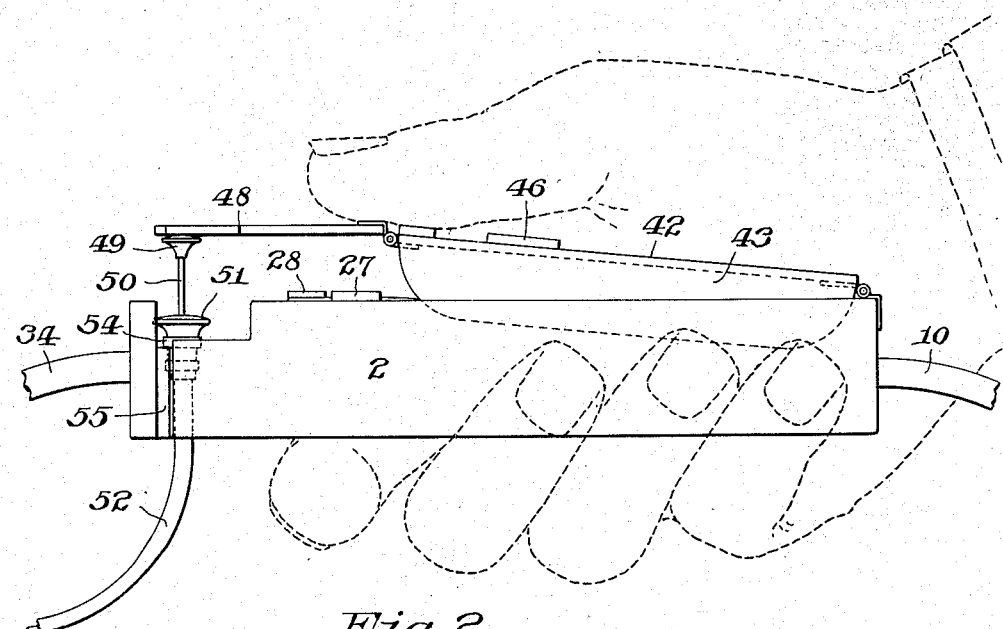
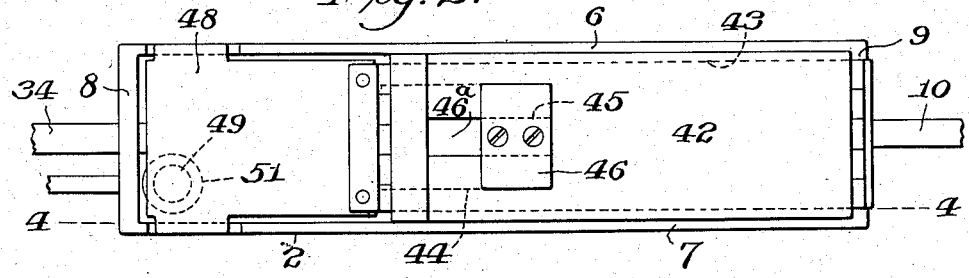
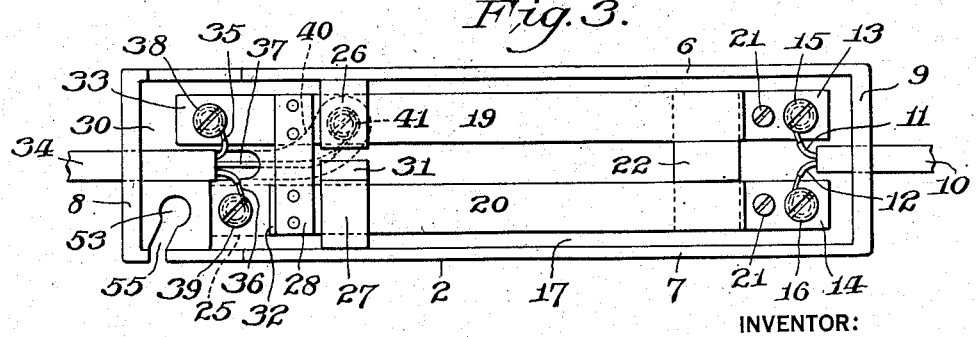
INVENTOR:
Albert E. Lipp,
BY
A. V. Groupe
ATTORNEY

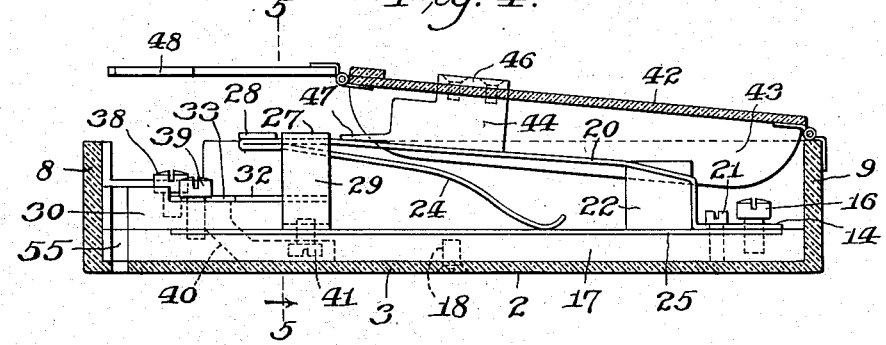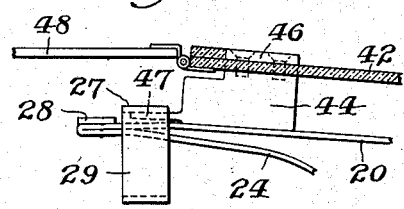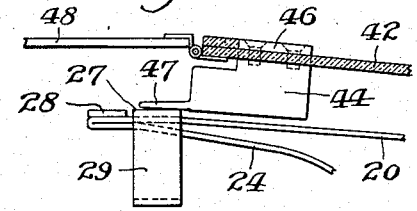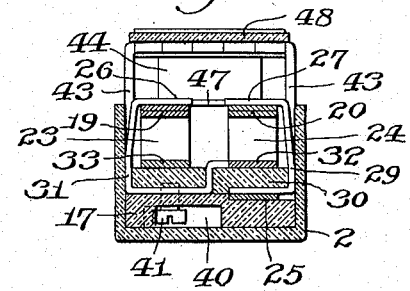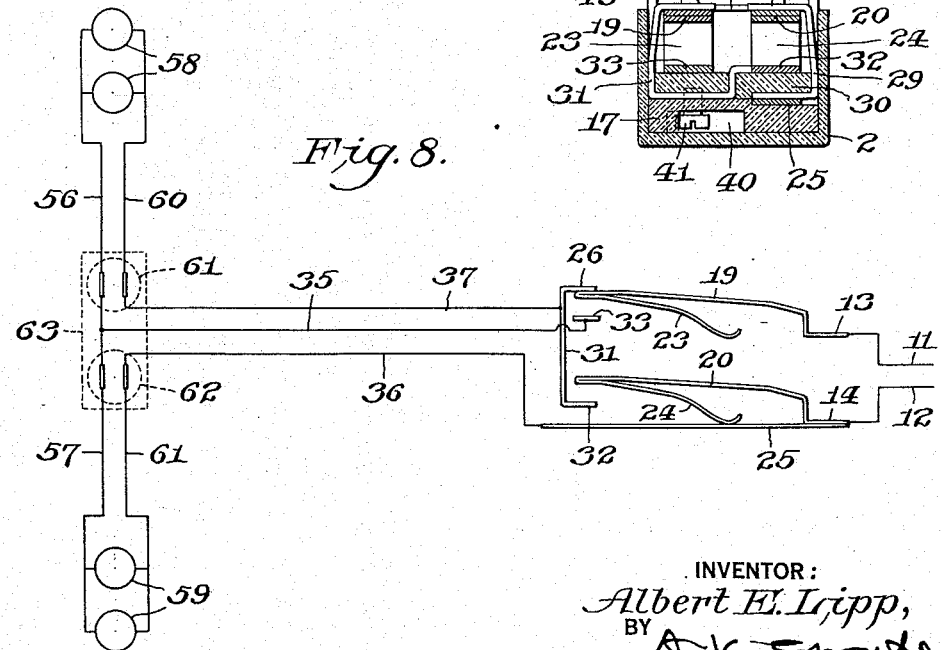

Patented July 21, 1936

2,048,013

UNITED STATES PATENT OFFICE 2,048,013

PHOTOGRAPHER'S LIGHTING APPARATUS

Albert E. Lipp, Philadelphia, Pa.

Application July 22, 1933, Serial No. 681,755

2 Claims. (Cl. 240—2)

This invention relates to improvements in photographers' lighting apparatus for supplying light in making exposures.

An object of the invention is to provide a novel and advantageous apparatus by means of which the desired light may be supplied to the image at the time the exposure is made and by means of which the camera shutter may be easily operated in proper timed relation to the light supplying means.

Another object is to provide a novel means whereby a plurality of electric lamps normally connected in series with a source of current may be connected in parallel with such source immediately before the opening of the camera shutter and returned to the normal series connection immediately after the closing of the camera shutter.

Another object is to provide a novel apparatus in which the same lamps for supplying the light for the exposures, remaining in the same positions, may be connected in series with a source of current for supplying the necessary light for focusing the camera and thereafter connected to such source in parallel for producing the brighter light for the exposures, thereby providing the same relative positions of the lights and shades on the image during the focusing and the making of the exposure.

The electric lamps, hereinafter referred to, employed in my invention will burn for a very limited time when connected in parallel for supplying the bright light; and a further object of my invention is to provide an apparatus which will utilize this limited time to the greatest extent in making exposures.

The invention resides in the novel construction, combination and arrangement of parts hereinafter described and claimed.

In the accompanying drawings, illustrating the invention,

Figure 1 is a side view of the casing of my improved apparatus, which contains the electric circuit making and breaking devices and camera shutter operating parts, showing portions of the parts leading therefrom, and showing, by dotted lines, the position in which the casing is held in the hand of the photographer.

Figure 2 is a top view of the casing and parts leading therefrom.

Figure 3 is a top view of the casing with the cover member and camera shutter operating parts removed therefrom.

Figure 4 is a longitudinal section through the casing on line 4—4 of Fig. 2.

Figure 5 is a transverse section through the casing, on line 5—5 of Fig. 4.

Figures 6 and 7 are detail views of the block for depressing the contact springs, and adjuncts, showing different positions of the block with relation to the adjacent parts.

Figure 8 is a diagrammatic view showing the electric lamps and the electrical connections thereof with the other parts of the apparatus.

Referring to the drawings, 2 designates an elongated, box-like casing or support formed of suitable electrical insulating material and comprising a bottom wall 3, side walls 6 and 7 and end walls 8 and 9.

The end wall 9 has a hole therein through which one end portion of an electrical cord or cable 10 enters the casing 2. This cord or cable contains two wires 11 and 12 which are electrically insulated from one another and which lead from a suitable source of electric current supply. The end portions of the wires 11 and 12 within the casing 2 are electrically connected to two laterally spaced terminals 13 and 14 by means of binding screws 15 and 16, respectively. These terminals 13 and 14 are secured upon a block or panel 17 of insulating material which rests upon the bottom wall 3 and fills the lower portion of the casing and is secured therein by means of a screw 18 which extends through the wall 3 and enters the panel.

The terminals 13 and 14 are connected to and form extensions of the ends of flat metal contact springs 19 and 20, respectively, which extend longitudinally within the casing 2 in parallel, spaced relation and have their end portions adjacent to the terminals 13 and 14 secured to the bottom panel 3 by means of screws 21. These contact springs 19 and 20 are alike in construction and they extend upwardly from the screws 21 and over a block 22 on the panel 17. The block 22 supports the secured end portions of the springs 19 and 20 which extend from the block through the major portion of the casing toward the end wall 8 thereof. The springs 19 and 20 are provided with lower arms 23 and 24 formed integrally therewith and bent to extend back toward the block 22 and downwardly toward the panel 17. The arms 23 and 24 terminate in advance of the block 22 and, after extending downwardly toward the panel, they are turned upwardly, providing the arms with end portions having rounded bottom bearing surfaces. The rounded end portion of the arm 23 of the spring 19 bears upon the top of the panel 17, and the rounded end portion of the arm 24 of the spring 20 bears upon the top of a metal plate 25, hereinafter referred to, which is carried by the panel 17 with its upper surface flush with the adjacent upper surface of the panel upon which the arm 23 of the spring 19 bears, and which has one of its end portions extending between the panel 7 and the terminal 14 in electrical contact with the latter.

The free end portions of the springs 19 and 20 extend beneath and beyond stop plates 26 and 27, respectively, and they are pressed upwardly by their own resiliency and the resiliency of their downwardly and rearwardly extending arms 23 and 24 and they rest normally in contact with the stop plates 26 and 27 from which they may be depressed, as will be hereinafter explained.

The portions of the springs 19 and 20 which extend beyond the stop plates 26 and 27 toward the end wall 8 are connected by a bar or plate 28 of insulating material having its end portions secured to the springs to maintain the free end portions thereof in proper lateral spaced relation and to give stability thereto and to cause them to be operated as a unit.

The stop plate 27 serves merely as a stop for limiting the upward movement of the contact spring 20 and it extends inwardly from and forms a continuation of the upper end of a plate 29 (Fig. 5) which rises from one side of the panel 7 and has its lower end portion bent inwardly and held in place between a block 30 of insulating material and the plate 25 hereinbefore referred to. The block 30 is secured to the top of the end portion of the panel 17 which is adjacent to the end wall 8 of the casing.

The stop plate 26 for the contact spring 19 forms the upper contact part of an electrical conducting plate 31 which extends downwardly from the outer end of its contact part 26 to the side of the panel 17 opposite to the plate 29 and thence inwardly between the top of the panel and the bottom of the block 30 secured thereon, and thence upwardly through a centrally located slot in the block, and thence over the top of the block to a position beneath the free end portion of the contact spring 20, as clearly shown in Fig. 5, and the lower free end portion of the plate 31 forms a contact part 32 to be engaged by the free end portion of the spring 20 to close a circuit when the springs 19 and 20 are depressed, as will be hereinafter explained.

Secured upon the block 30, at one side thereof, is a contact plate 33, one end portion of which extends beneath the free end portion of the contact spring 19 (see Figs. 4 and 5). The upper surface of the contact plate 33 is in the same plane with the upper surface of the lower contact part 32 of the conducting plate 31, so that when the springs 19 and 20 are depressed as a unit from the normal position illustrated in the drawings to move their free end portions into contact with the parts 33 and 32, respectively, the electrical connection between the spring 19 and the conducting plate 31 will be broken and electrical connections between the springs 19 and 20 and the plates 33 and 32, respectively, will be established, for a purpose hereinafter explained.

The end wall 8 of the casing 2 has a hole therein through which one end portion of an electrical cord or cable 34 enters the casing. This cord or cable 34 contains three wires 35, 36 and 37 which are electrically insulated from one another and which extend from the end of their common covering within the casing, the wire 35 is electrically connected to the contact plate 33 by means of a screw 38, the wire 36 is electrically connected to the end portion of the plate 25 remote from the terminal 14 by means of a metal screw 39 which extends through the block 30 and is screwed into the plate, and the wire 37 extends down into an opening 40 formed in the block 30 and panel 17 and is electrically connected to the conducting plate 31 by means of a metal screw 41 which extends upwardly from within the opening 40 and through the wall of the panel 17 and is screwed into the plate 31.

Hingedly connected to the top of the end wall 9 of the casing is a cover member 42 which extends from the wall 9 to the region of the free ends of the contact springs 19 and 20. This member covers the contact springs and is provided with downwardly extending side flanges 43 which embrace the springs and are arranged between and in close proximity to the side walls 6 and 7 of the casing.

The cover member 42 carries a block 44 of insulating material which is located between the flanges 43 and rests upon the contact springs 19 and 20. The block 44 and member 42 are so related to the contact springs that when the casing 2 is grasped in the hand of the user of the device with the thumb resting upon the member 42, as shown by dotted lines in Fig. 1, the thumb may be depressed to depress the member and thereby cause the block 44 to depress the contact springs 19 and 20 into contact with the contact parts 33 and 32, respectively, beneath them.

The block 44 is provided with an upwardly extending rib 45 which is fitted to slide in a longitudinal slot 46ª in the member 42, and the block 44 is slidably held in place by a plate 46 which is secured to and extends outwardly from the rib 45 and is fitted to engage the top surface of the member 42. The lower portion of the block 44 has a blade or flange 47 formed thereon and projecting therefrom toward the casing end wall 8. This blade is adapted to be moved into a position above the stop plates 26 and 27 or into a position below the same by moving the block 44, for purposes presently appearing.

The block 44 rests normally in the position shown in Fig. 4, wherein the contact springs 19 and 20 rest in contact with the stop plates 26 and 27, respectively, and wherein the member 42 may be depressed to break electrical contact between the spring 19 and plate or part 26 and to make electrical contact between the springs 19 and 20 and the contact parts 33 and 32, respectively. When the springs 19 and 20 are depressed slightly and the block is moved toward the end wall 8 to move the blade 47 into a position between the springs and their stop plates 26 and 27, as shown in Fig. 6, the blade 47 will prevent the spring 19 from making contact with the contact part 26 and yet will permit the member 42 to be depressed to depress the springs 19 and 20 into contact with the contact parts 33 and 32, respectively; and when the member 42 is raised slightly and the block 44 is moved to move the blade 47 into a position above the stop plates 26 and 27, the stop plates will be engaged by the blade which will thereby prevent the member 42 from being depressed to operate the contact springs 19 and 20.

Hingedly connected to the free end of the member 42 and extending therefrom over and beyond the free ends of the contact springs 19 and 20, and forming, in effect, a continuation of the member 42 is a camera shutter operating part or plate 48 which is movable by and with the member 42 and also independently of the member on its hinged connection therewith for operating a camera shutter as will be hereinafter explained.

One side of the free end portion of the part 48 is located over the head 49 on the free end of a small rod or pin 50 which extends through and above a head 51 which is carried by one end portion of a flexible tubular member 52 of a well known camera shutter operating device such as is shown and described in my previous Patent No. 1,869,158, dated July 26, 1932. In this device the head 49 is moved toward the head 51 against the action of a spring to operate the camera shutter in the usual manner, and, after the head 49 has been so moved and thereafter released, the spring will return it to the position shown in Fig. 1. Thus it will be understood that the part 48 may be depressed to depress the head 49 for the operation of a camera shutter.

The end portion of the tubular member 52 extends through a hole or opening 53 in the bottom wall 3 of the casing 2, the panel 17 and the block 30 therein, and the head 51 on the member 52 rests upon the block 30 and supports the head 51 and the end portion of the tubular member 52 carrying the same. The block 30 and the panel 17 and casing wall 7 are provided with a passage 55 which extends laterally from the hole or opening 53, as clearly shown in Fig. 3, and through which the tubular member 52 may be moved into or from within the opening 53, and the parts of the member 52, a little distance from the head 51, are small enough in diameter to permit the member to be passed through the passage 55 into and from within the opening 53 while the parts of the head or member 51 below the collar 54 and located within the opening 53 is larger in diameter than the space between the opposing walls of the passage 55, so that such walls will retain the member 52 and head 51 in the position shown in Figs. 1 and 2, after the member 52 has been passed through the passage and the head 51 has been lowered to bring the collar 54 into engagement with the top of the block 30.

Referring now to Fig. 8, the conductor or wire 35 which leads from the contact plate 33 is connected to two branch wires 56 and 57 which, in turn, are connected to one side of two sets of electric lamps 58 and 59, respectively; and connected to the opposite sides of the two sets of lamps 58 and 59 are two branch wires 60 and 61 which form continuations of the wires 37 and 36 leading from the conducting plates 31 and 25, respectively.

The branch wires 56 and 60, leading to the set of lamps 58, are interrupted by a plug-and-socket connection, indicated at 61 by dotted lines, and the branch wires 57 and 61, leading to the set of lamps 59, are interrupted by a plug-and-socket connection, indicated at 62 by dotted lines; the sockets of these connections are mounted on a common block, indicated at 63 by dotted lines, and the plugs of the connections are connected to the branch wires which lead to the two sets of lamps. This construction provides a convenient arrangement for connecting and disconnecting the several parts and enables me to use a common cord or cable for the three wires 35, 36 and 37 leading from the casing 2 to the block 63, and two cords or cables which are detachable from the block 63 for the two pairs of branch wires 56, 60 and 57, 61 which lead to the two sets of lamps 58 and 59, respectively.

The two sets of lamps 58 and 59 may be placed in any suitable positions for producing the desired light on the person or persons or object or objects to be photographed, and any number of lamps may be used in each set in accordance with the light desired. I have found 100 watt, 64 volt lamps to give very good results when my invention is used on the usual commercial 110 volt A. C. current.

It will be observed that when the contact making and breaking devices in the casing 2 are in the normal position, as shown in Figs. 1, 4, 5 and 8, the wire 35 is dead and the wires 37 and 36 are connected to the terminals 13 and 14, respectively, and the lamps 58 and 59 are connected in series with the source of current. It will also be observed that when the contact springs 19 and 20 are depressed into contact with the contact parts 33 and 32, respectively, the connection of the wire 37 with the terminal 13 will be broken and the wire 35 will be connected to the terminal 13 and the wires 36 and 37 will be connected to the terminal 14, thereby connecting the lamps 58 and 59 in parallel.

When the apparatus is in service, the sets of lamps are placed in position for the desired light, wires 11 and 12 are connected to a source of current and the casing 2 is held in the hand of the photographer, as shown by dotted lines in Fig. 1, with the camera shutter operating parts in the positions there shown, and the free end portion of the thumb of the hand holding the casing 2 resting lightly upon the adjoining end portions of the member 42 and part 48 and crossing the hinge connection between them, as illustrated. When the photographer is ready to make the exposure, he first uses his thumb to depress the member 42 until the contact springs 19 and 20 make contact with the parts 33 and 32, respectively, and thereby connect the lamps 58 and 59 in parallel and increase the brilliancy thereof for the exposure; and, while this is being done, a rocking action of the thumb prevents it from depressing the part 48 and therewith the head 49 sufficiently to trip or operate the camera shutter to which the rod 50 is operatively connected. After the member 42 has been fully depressed, a reverse rocking action of the thumb depresses the part 48 and perforce the head 49 and operates the camera shutter to make the exposure while the lamps 58 and 59 are connected in parallel; and, immediately thereafter, the pressure of the thumb upon the part 48 and member 42 is released and the parts are all permitted to return automatically to the normal position shown in Figs. 1 and 4, thereby returning the series connection to the lamps. Thus it will be understood that the lamps 58 and 59 are connected in parallel, for the supply of the bright light only for a very short interval of time which is slightly in excess of the time required for the exposure.

It is well known that camera shutters as operated by the depression and release of the head 49, may be set so that the shutter will automatically close after the depression of the head 49 opens the same, or so that the depression of the head will open the shutter and it will remain open until the pressure on the head is removed and it is permitted to rise automatically under the control of the photographer. Therefore it will be understood that in either, the member 42 and part 48 may be manipulated to have the lamps 58 and 59 connected in parallel while the shutter is open.

The advantage of moving the block 44 to the position shown in Fig. 6 is that, in this position, no current at all will be supplied to the lamps 58 and 59 except when the member 42 is depressed to connect the lamps in parallel, thereby eliminating the series connection for the lamps; and the advantage of moving the block to the position shown in Fig. 7 is that, in this position, the member 42 can not be depressed to connect the lamps in parallel but the part 48 can be depressed to operate the camera shutter for a properly timed exposure while the lamps are connected in series.

I claim:

1. In a photographer's lighting apparatus, the combination of a support having terminals for connection with a source of electric current, two spring contact arms connected to and extending from said terminals and adapted to be depressed from a normal position to a circuit closing position, a member movable relatively to the support and provided with means to move said arms from said normal position to said circuit closing position and having a movable camera shutter operating part associated therewith, a plurality of electric lamps, and electrical conductors related to said arms to connect said lamps in series with said terminals when said arms are in said normal position and to break said series connection and connect said lamps in parallel with said terminals when said arms are moved to said circuit closing position.

2. In a photographer's lighting apparatus, the combination of a support having terminals for connection with a source of electric current, two spring contact arms connected to and extending from said terminals and adapted to be depressed from a normal position to a circuit closing position and to an intermediate position between the first and second named position, a member movable relatively to the support and provided with means to move said arms from said normal position to said circuit closing position and to said intermediate position and having a movable camera shutter operating part associated therewith, a plurality of electric lamps, electrical conductors related to said arms to connect said lamps in series with said terminals when said arms are in said normal position and to break said series connection when said arms are moved from said normal position and to connect said lamps in parallel with said terminals when said arms are moved to said circuit closing position, and a stop device movable to and from a position preventing the return of said arms to said normal position after being moved to said intermediate position.

ALBERT E. LIPP.